INVENTOR
O. H. A. Lammert

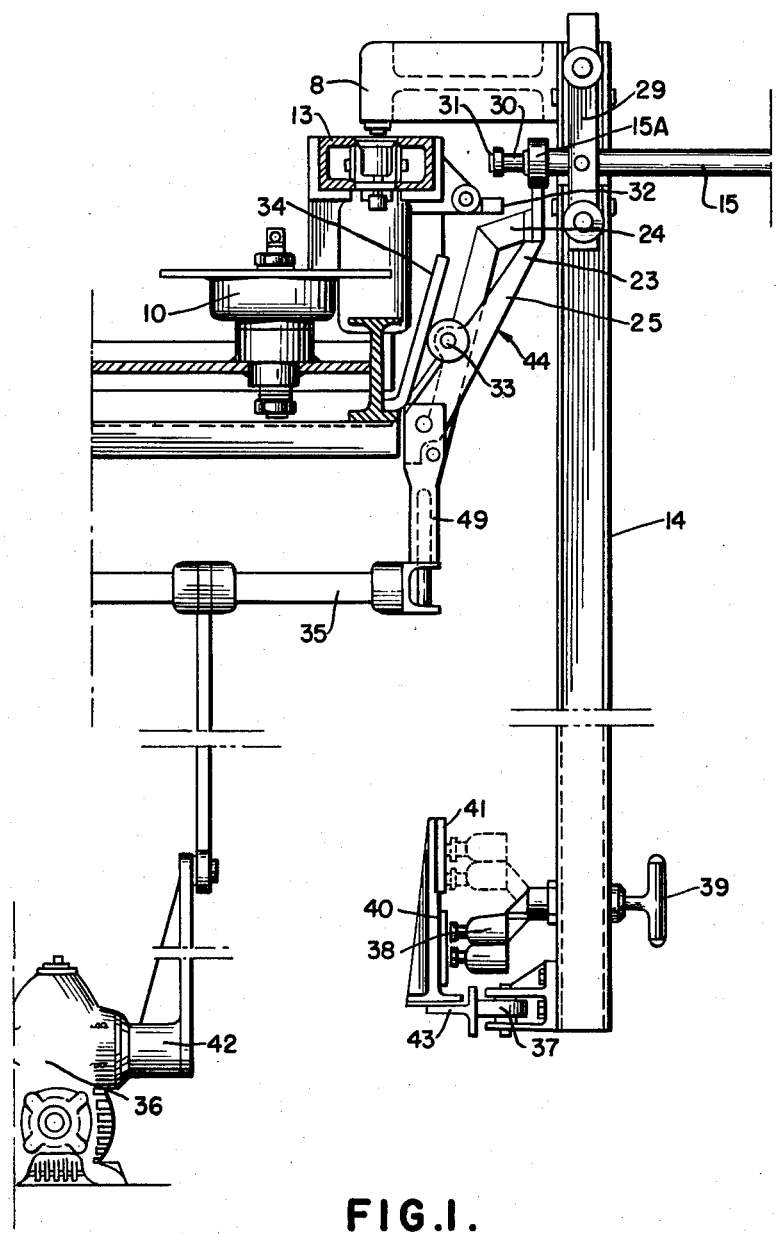
FIG.I.

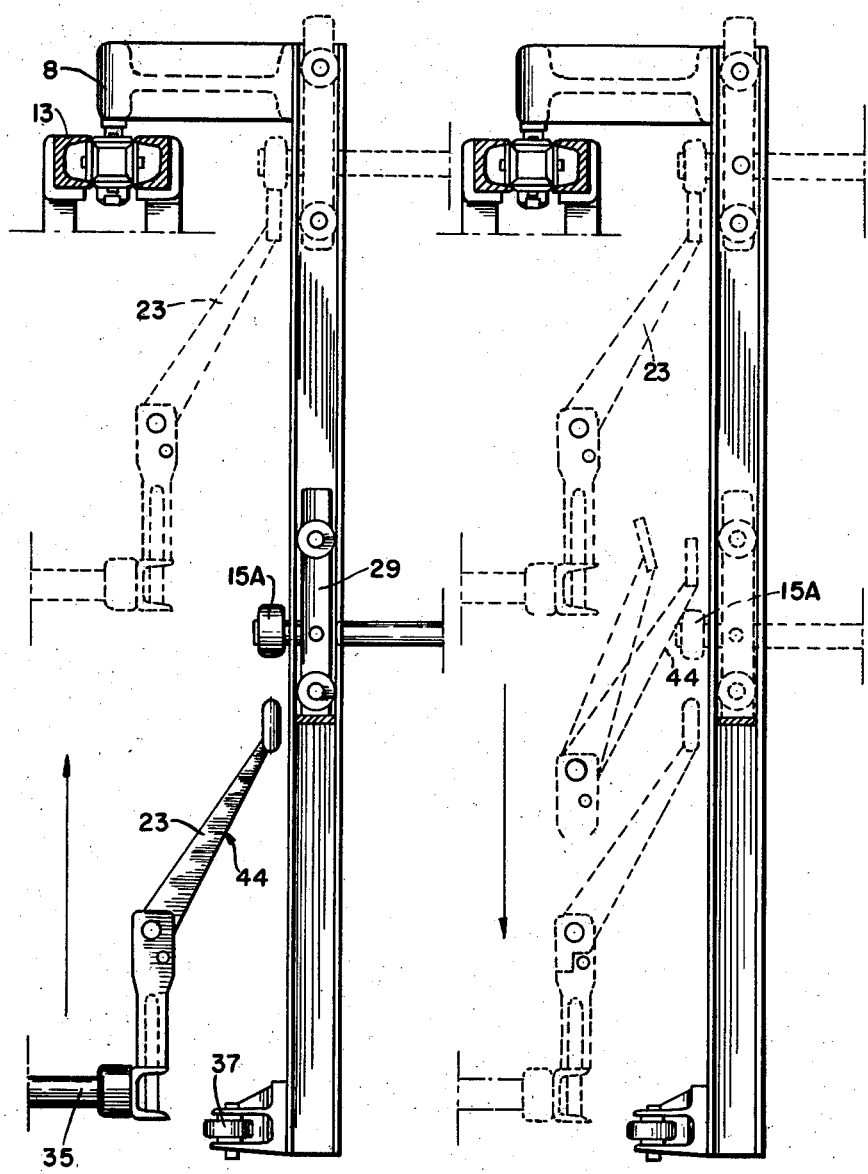

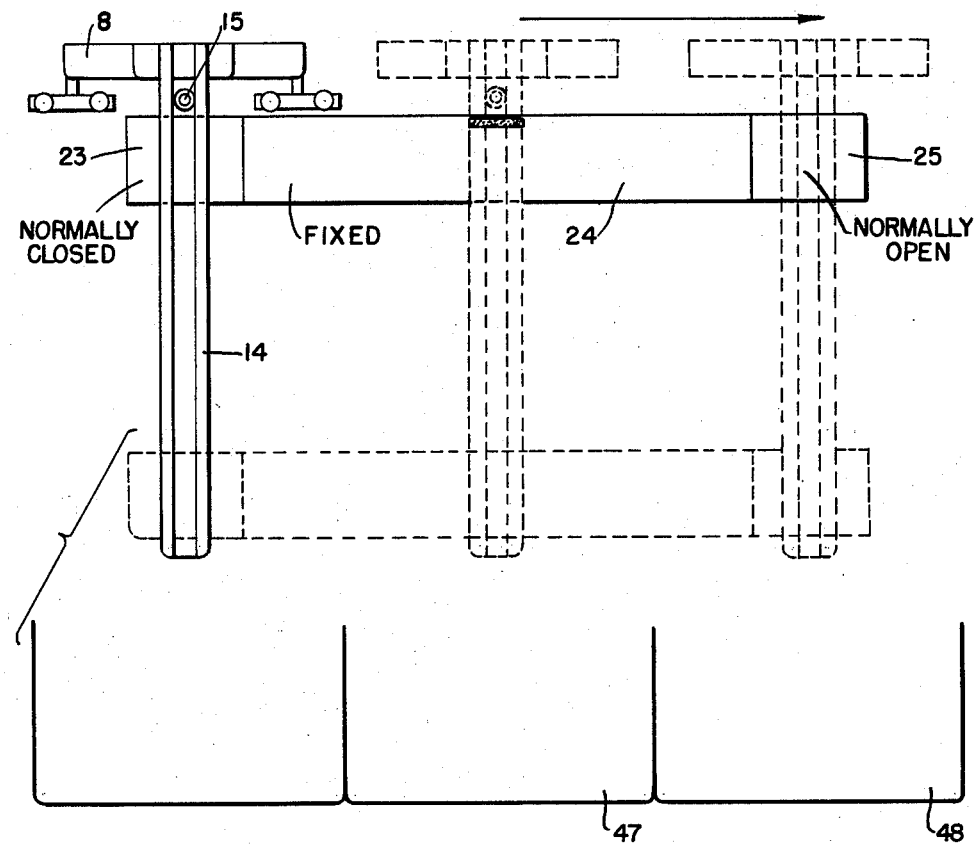
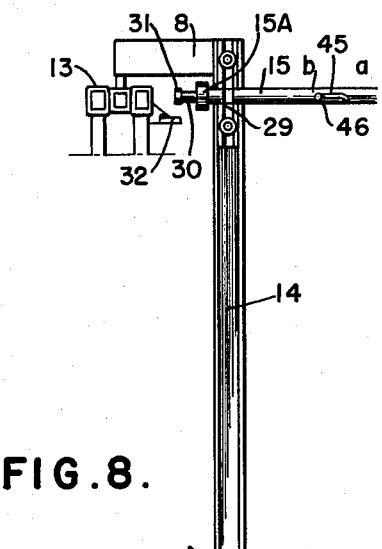
FIG. 7.
FIG. 8.

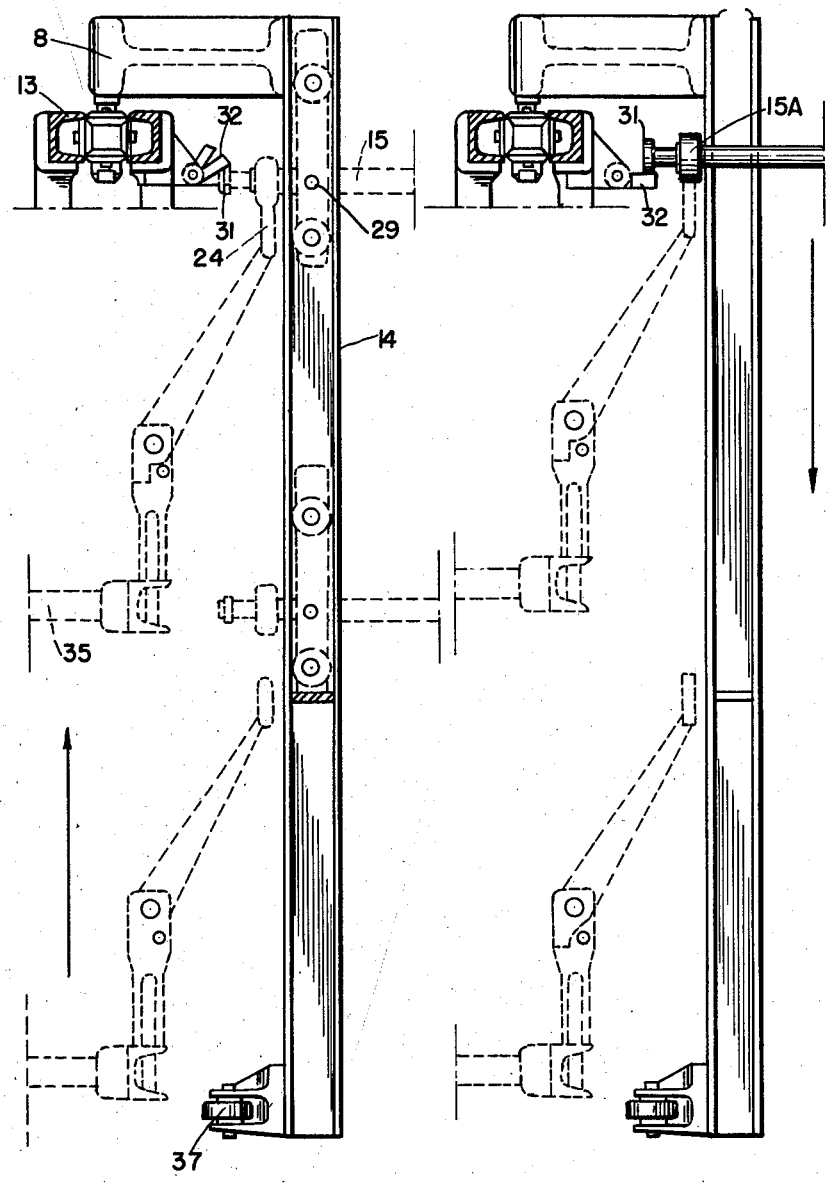

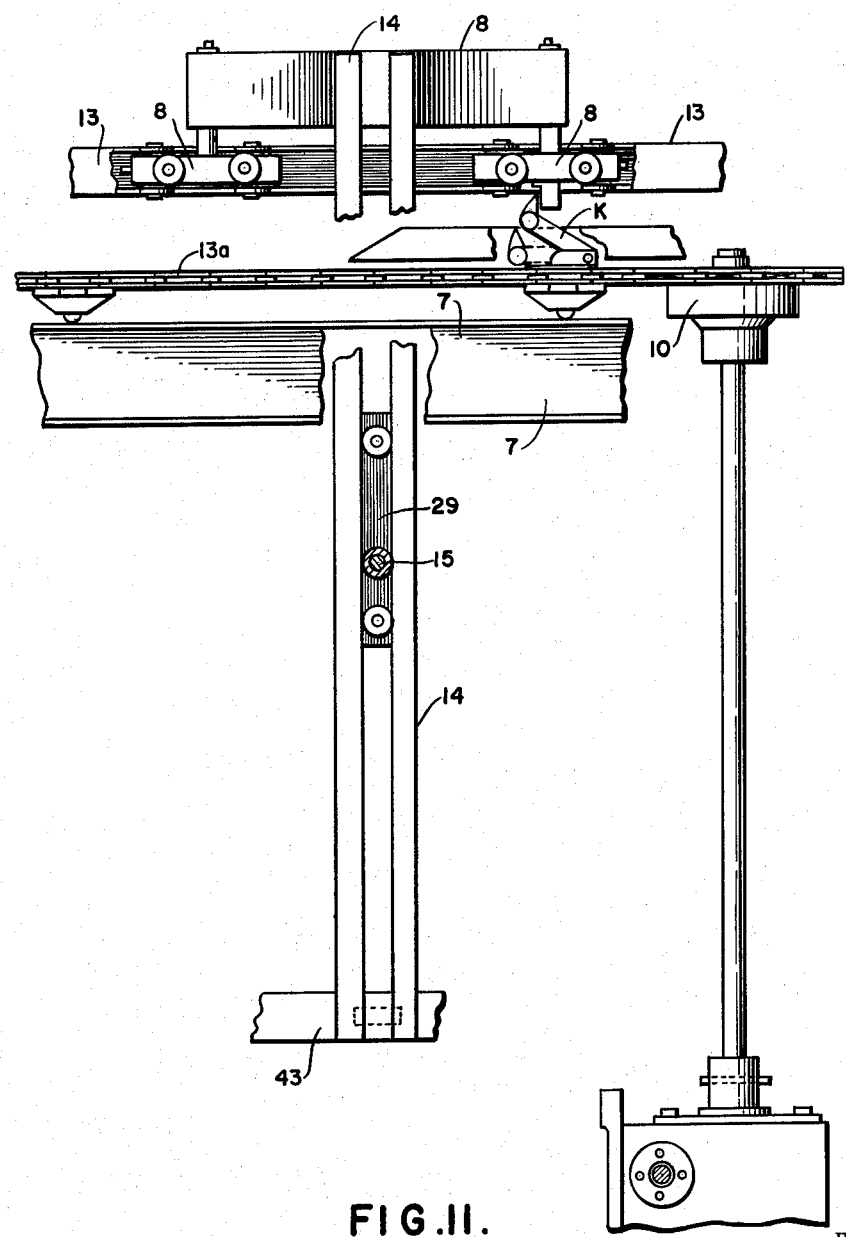
FIG.II.

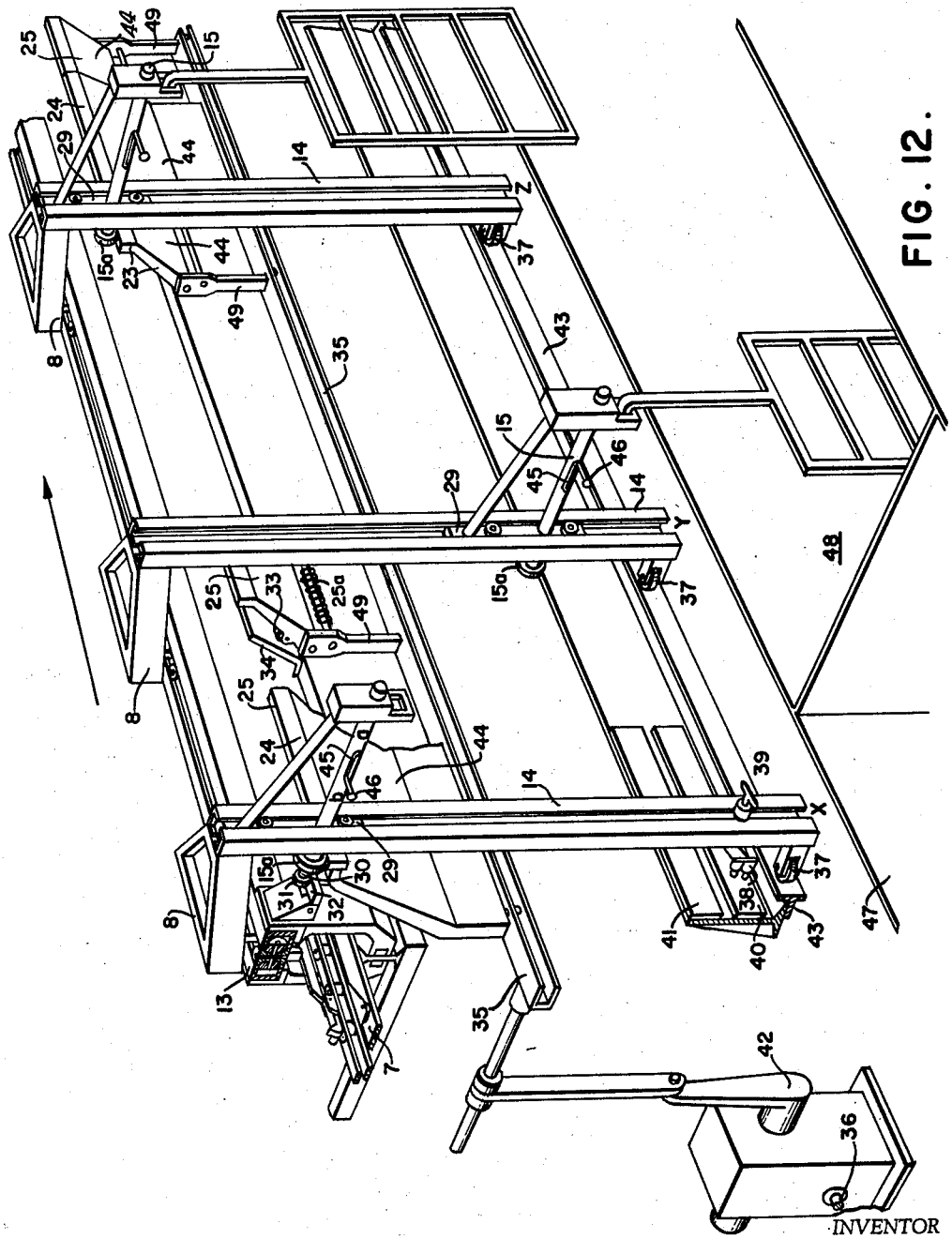

United States Patent Office 3,152,705
Patented Oct. 13, 1964

3,152,705
AUTOMATIC EQUIPMENT FOR CONVEYING, RAISING AND LOWERING OF GOODS
Otto Heinrich August Lammert, Molndal, Sweden
Filed Jan. 27, 1961, Ser. No. 85,385
Claims priority, application Germany, Feb. 2, 1960, L 35,271
8 Claims. (Cl. 214—89)

The present invention relates to automatic equipment for conveying, raising and lowering of goods. More particularly it relates to such apparatus which renders possible the raising and lowering of goods being conveyed forwards both continuously and intermittently. In such apparatus it should also be possible, if desired, to omit lowering the goods by setting a lever so that one treatment process is omitted and to apply this procedure separately to each carriage. Should this setting take place too late, the arrangement of the apparatus should be such that damage to the members acting accordingly is avoided. If the conveying equipment is to be used for electro-chemical purposes, it should also be possible to apply to each carriage individually various voltages for the treatment of the articles on the carriage, by changing over a current contact.

Various treatment tanks in which the goods are treated are arranged on an enclosed conveyor path. The carriages which carry the articles to be treated are moved forwards along this conveyor path with gripping members on a conveyor chain running along the path. Some treatment processes, however, require a considerably longer treatment time than others. In some cases, the carriages are uncoupled from the driving chain and then push one another along by the length of one carriage at a time. In this case no transfer of goods from one bath to another in general takes place and instead the goods generally remain immersed in the treatment bath.

The goods which are to be treated are suspended from lifting arms. These lifting arms are mounted at one end on a lifting carriage which is movable vertically and which runs by means of rollers in a closed, vertically suspended track which is secured to the horizontal carriage. A roller is provided at the lower end of this vertical lifting track which runs horizontally against a track and so takes up the lateral pressure of the suspended goods. The horizontal carriage which is provided with bogies having travelling and guide rollers, runs at the top in a closed horizontal track. Bolted to this carriage is the vertical lifting track with the lifting carriage and the lifting arm. A thrust roller, which lies horizontally, is provided at the lower end of the lifting track. The apparatus is therefore so constructed that it is fixed at the top and loose at the bottom, so that the vertical track may be moved outwardly at the bottom, thus preventing breakage and breakdowns as a result of stretching of the chain or failure in the operation of a limit switch.

According to the invention, in conveying apparatus of the type mentioned above there is provided at each of one or more points at which the lifting arms with the goods present thereon are to be conveyed from one treatment bath into another bath, a special mechanism which is adapted to effect this conveying. The mechanism according to the invention consists of a multiplepart bridge, the center portion of which is connected to a mechanical or hydraulic lifting device, is movable in the vertical direction, but is otherwise fixed, and the two lateral portions of which are connected to the center portion in such a manner that they automatically participate in the vertical movements of the center portion but are otherwise adapted for movement and formed in such a manner that the lateral portion which effects the lifting of the lifting arm that is the portion to the rear seen from the conveying direction can slide past the lifting arm to be lifted during the downward movement of the bridge before the lifting operation and, in the lowest position, automatically drops into a "working position" in which it engages and entrains the lifting arm during the upward movement, while the other lateral portion which effects the lowering of the lifting arm, that is the one which is to the front seen from the conveying direction, is guided by an appropriate guide under the lifting arm to be lowered when in its highest position, can carry this lifting arm down with it and, after carrying out the lowering operation, automatically drops into a "position of rest" in which the bridge can be raised again without this lateral portion engaging the lifting arm.

Raising or lowering of the lifting arm does not have to take place every time a carriage is displaced forwards and bridges for raising and lowering are only provided wherever the goods on the lifting arm have to be conveyed from one tank into the next over the tank partition along the conveying path. In those cases in which the operational processes in the adjacent tanks are so short that only one cycle is necessary for each treatment, the lifting bridge is adapted in such a manner that a plurality of lifting arms can be raised and lowered simultaneously, whereas in those tanks which require a prolonged treatment time, the bridge and the lifting arm have to be freed from one another. The forward movement of the carriage along the conveyor path always takes place when the bridge is at the top and the lifting arms with the goods are at their highest position.

The problem to be solved is to get the inner end of the lifting arms onto the bridge when the lifting arms are in their lowest position in order that lifting can take place and then, after the conveying has taken place, to release the bridge from the end of the lifting arm again so that the latter can remain in the lowest position without being grasped by the bridge again.

As a result of its simple operation, the arrangement according to the invention avoids or substantially reduces these disadvantages and substantially guarantees complete safety in all circumstances even when the lifting arm is greatly overloaded. The lifting and lowering bridge is as stated above preferably divided into three parts, namely a rear lateral portion, a central portion and a forward lateral portion, the two lateral portions being movable independent of the central portion and of such large dimensions that satisfactory operation of the conveyor chain is assured even when it is greatly lengthened through wear. The center portion of the bridge is fixed and connected to a mechanical or hydraulic lifting device. The bridge is preferably positioned substantially parallel to the longitudinal direction of the conveyor path, the upper surface of the bridge being horizontal. The top of the bridge which comes into contact with the inner end of the lifting arm is preferably provided with a surface over which the end of the inner arm can slide, that is to say the top of the bridge is so shaped and formed that the inner end of the lifting arm may always engage with the contact and lifting surface of the bridge, wherever it may be on the bridge and may always be activated thereby.

As stated above the forward movement of the horizontal carriage along the conveyor path always takes place when the bridge is up and the lifting arms with the associated vertical carriages are at their maximum height. Thus, if the bridge has to raise a lifting arm from its lowest position, it must first be able to pass the end of the lifting arm. The rear lateral portion of the bridge is therefore so arranged that it may brush past the inner end of a lifting arm, and dropping back forwards again into the lifting position when the lifting arm has been passed so that it may be raised with the bridge. Should the horizontal carriage have come too far forwards as a result of faulty operation, so that the lifting arm cannot act on the movable part of the bridge, the slideway on the fixed part of the bridge urges the vertical lifting track of the carriage outwards, this being possible because it is movable at the bottom so that the inner end of the lifting arm again slips into the lifting position on the runway on the bridge.

When the bridge is at its highest point, the inner end of the lifting arm reaches the front lateral portion of the bridge. When the bridge reaches its lower position the inner end of the lifting arm should separate from the bridge so that the lifting arm remains in the low position without again being entrained by the bridge. As already indicated, the front lateral portion is also movable and so adjusted, by spring pressure or weights, that it always remains "open" in the low position and therefore cannot entrain a lifting arm. The bridge therefore goes up taking one lifting arm with it engaged by the rear lateral portion. The front lateral portion of the bridge remains "open." Mounted behind this portion is a roller. During the upward movement of the bridge, this roller runs against a curved member which urges this portion into alignment with the track of the bridge so that the lifting arm can then again run onto the track of this end portion. The weight of the lifting arm then holds this bridge portion firmly in this position until the bridge has been lowered to such an extent that the end of the lifting arm and the front lateral portion of the bridge are free of one another. The front lateral bridge portion then swings "open" again and the end of the lifting arm is free of the bridge at the bottom and the bridge can then pass the lifting arm without entraining it on its way upwards.

Hitherto, in the description, the end of the lifting arm to be entrained has been immovable whereas the lateral portions of the bridge effecting the raising and lowering respectively of the lifting arm are adapted for movement, and the two parts cooperate in such a manner that the end of the lifting arm just comes to rest on the contact surface of the bridge during the raising or lowering. It is also possible, of course, for the end of the lifting arm to be made movable thus transmitting some of the said cooperation of the members to the end of the lifting arm. For example, if the end of the lifting arm can go back sufficiently far, on sliding past the bridge, and automatically returns to the initial position after sliding past, then the rear lateral portion of the bridge which effects the lifting operation can also be made immovable. These forms of construction are regarded as technical equivalents of the preferred embodiment of the invention.

In conveying equipment, cases may arise in which some goods do not have to be subjected to certain treatment processes. In such cases, the end of the lifting arm on which the goods are suspended is provided with a lever which can be displaced along a track and can be located in relation to the track, in various depressions. As a result of displacement of this lever horizontally towards the lifting end of the lifting arm, an extension shaft, with a roller, is pushed out of the lifting end. This shaft is connected to the lever and can be pushed out of the lifting end to a greater or lesser extent as a result of horizontal displacement of the lever. The lifting arm is thus extended at its lifting end when one or more operational processes have to be omitted. In the middle, when the lifting and lowering bridge is in its highest position, short lengths of rail are provided on the conveyor path over the tanks where the treatment is to be omitted, the upper track of the rails lying parallel to the track of the bridge. Since the forward conveying takes place rhythmically, the extended portion of the lifting arm runs onto this length of rail and remains there. The lifting arm then no longer participates in the operation of the bridge. During the next forward movement, which always takes place when the bridge is in the highest position, the lifting arm leaves the rail and again participates in the movements of the bridge. A spring arrangement in the lifting arm pulls the extension member back again when the lever meets a resistance at the front on the arm, which urges it into the upper slideways, that is to say it is pressed out of the detent depressions. Normally the length of rail described above can be fixed. It is an advantage, however, if it is movable upwards. If the extension portion of the lifting arm should be pressed out just under the rail while the platform is rising, for example as a result of faulty operation by the operator, fracture and bending of the shaft is avoided. The rail yields to the pressure of the rising extended shaft so that the shaft can pass and so comes to lie on the track of the rail.

In electrolytic treatment processes, it may happen that it is desired to supply each individual lifting arm, that is to say each individual carriage in the conveyor system, with different voltages. In order to render this possible, current may be applied to the carriage in the form of sliding contacts engaging with a number of superimposed bus-bars which may be engaged as desired, for example by rotation of control means in the same treatment process.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 1 is a cross-sectional view through an elevator and static frame of a machine constructed in accordance with the present invention having work carrier arm carriages constructed in accordance with the present invention.

FIGURE 2 is a diagrammatic vertical section taken through a horizontally running carriage and bridge mechanism constructed in accordance with the present invention.

FIGURE 3 is a view similar to FIGURE 2 in various positions of operation, FIGURES 2 and 3 being combined to show a cycle with respect to one of the bridge members.

FIGURE 7 is a schematic elevational view showing the horizontally running carriage in both solid and dotted line positions with respect to the three bridge members.

FIGURE 8 is a schematic of the vertically suspended track carried by the horizontally running carriage with the work carrier arm extension being extended to retain the work arm in the elevated position.

FIGURES 9 and 10 are views similar to FIGURES 2 through 5 inclusive, showing cyclic operation between the work carrier arm carried in the vertically suspended track with respect to the static frame and bridge elevatable members.

FIGURE 11 is a fragmentary side elevational view with parts broken away and parts shown in section showing the manner of driving the horizontally running freely movable carriage.

FIGURE 12 is a perspective view taken through three stations of the machine showing the three bridge members and three horizontally movable carriages.

Figures 4, 5:
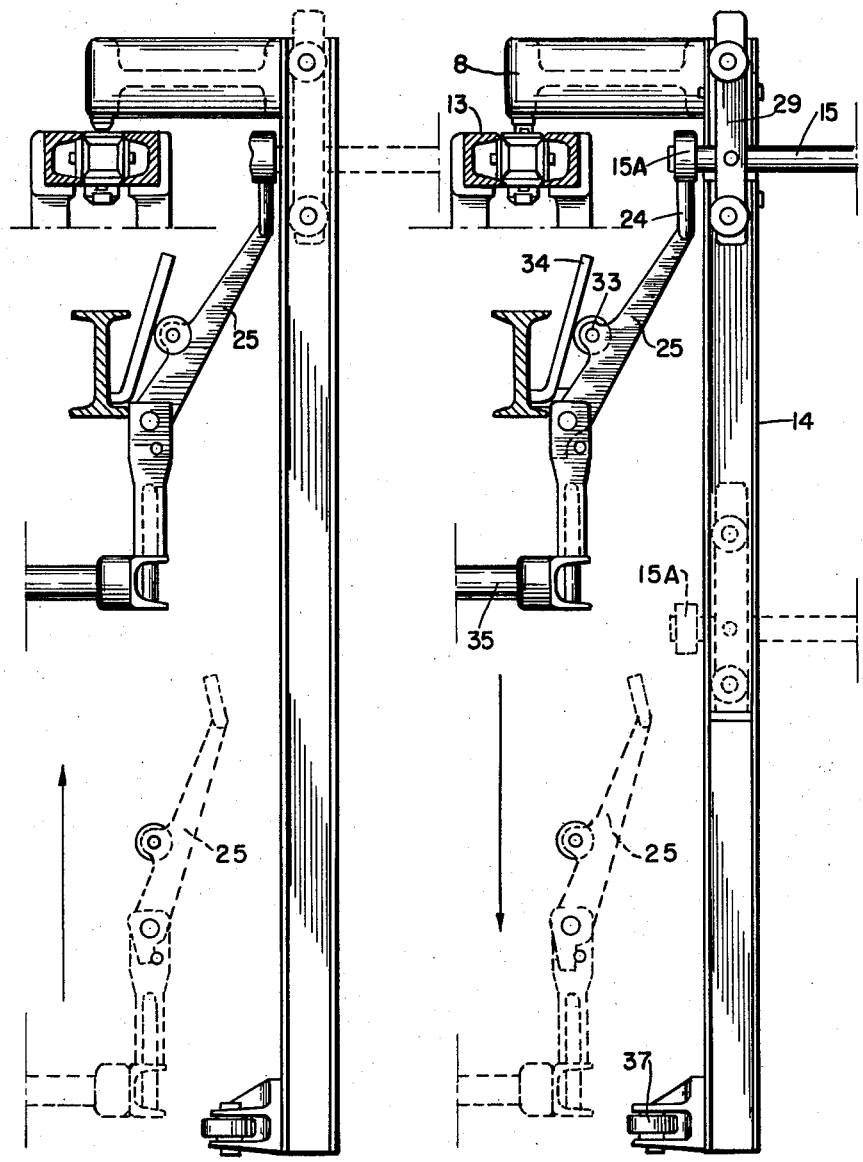
FIGURES 4 and 5 are views similar to FIGURES 2 and 3 with respect to another of the bridge members in its various phases of operation showing the relative positions of the work carrier arm with respect to the lifting bridge.

Referring more particularly to the drawings and for the moment to FIGURES 1 and 12, apparatus constructed in accordance with the present invention comprises a runway 7 of a conveyor path 13, over which runway a conveyor chain 13ᵃ, best seen in FIGURE 11, passes.

Running in this conveyor path 13 is a carriage 8 in the form of a bogie which is driven through a chain wheel 10 which activates chain 13a engaging with the carriage, as best seen in FIGURE 11, the carriage being moved forwardly on travelling and guide wheels 8a. A vertical guide rail 14 is secured to the carriage 8 and is provided with a work carrier arm 15 to the outer end of which goods to be treated may be secured, as best seen in FIGURE 12.

The work carrier arm 15 which is mounted on a carriage 29 is provided at its inner end with a travelling roller 15a, a shaft 30 and with a further travelling roller 31, which shaft 30 and roller 31 provide an extension of the work carrier arm 15 and which can bear on a length of rail 32 when a treatment is to be omitted, as best seen in FIGURES 1 and 7.

The extension may be operated by a lever 46, FIGURES 8 and 12, running in a slot 45. In these figures the position of the treatment tanks 47 and 48 is also shown.

The travelling roller 15a engages with a bridge having three flipper portions 23, 24 and 25, respectively, which are referred to herein as the rear lateral portion, the central portion and the front lateral portion, best seen in FIGURES 7 and 12.

Positioned on the front lateral portion 25, FIGURES 4 and 5, is a roller 33 which acts against a cam member 34 carried by the static frame to urge this portion of the bridge member into working position with respect to the remaining two flippers of the bridge. All three portions are provided with a slanting surface 44, FIGURE 12.

The whole bridge member itself is supported on an elevator frame 35, 49, which can be moved up and down by actuation of a drive motor 36, operating a motor-driven worm drive 42, FIGURE 12.

At the lower end of the carriage guide arm 14 there is provided a thrust roller 37 which runs horizontally against a track 43, this taking up the lateral thrust of goods suspended from the work carrier arm 15. Positioned at the lower end of the carriage guide 14 there is also provided a rotatable sliding contact 39 provided with contact points 38 engageable with bus bars 40 or 41 carrying different voltage or different currents for particular treatments.

The mode of operation of the apparatus described will now be explained with reference to FIGURES 2 through 9 of the accompanying drawings.

Referring to FIGURES 2 and 3 which illustrate the mode of operation of the lateral portion or bridge flipper 23, the stages of operation are indicated by four consecutive Roman numerals, of which I shows the flipper 23 which has brought up a work carrier arm, shown in dotted lines, and this has been conveyed by the chain conveyor 13a onto the center bridge member 24, seen best in FIGURES 7 and 12.

Roman numeral II, FIGURE 3, shows the flipper 23 as falling down with the bridge member passing another lifting arm of the next carriage on the conveyor which is below.

Roman numeral III, FIGURE 2, shows the flipper 23 as having dropped back into the lifting position below this next work carrier arm 15 under its own weight.

Roman numeral IV, the upper portion of FIGURE 2, shows the flipper 23 lifting the arm 15 back into the initial position of Roman numeral I in the upper portion of FIGURE 3.

FIGURES 4 and 5 show the mode of operation of the front flipper 25 of the bridge member, the stages being indicated by Roman numerals as follows:

I, the upper portion of FIGURE 5, shows a work carrier arm 15 which has run onto the portion 25 of the bridge member from the fixed center portion 24. The cam 34 urges the flipper 25 into the working position via the roller 33. As the elevator 35 is lowered and the flipper falls, the roller 15a on the work carrier arm 15 holds the flipper 25 firmly in position.

As shown in II, the lowest position has been reached, the roller 15a being free of the portion 25 and this drops back by means of a spring 25a and opens the track. On going up, the roller 15a no longer encounters the flipper 25.

As shown in III, at the lower portion of FIGURE 4, the flipper 25 is in its free position.

As shown in IV, the upper portion of FIGURE 4, the initial position of I, the upper portion of FIGURE 5, is again reached.

Figure 6:
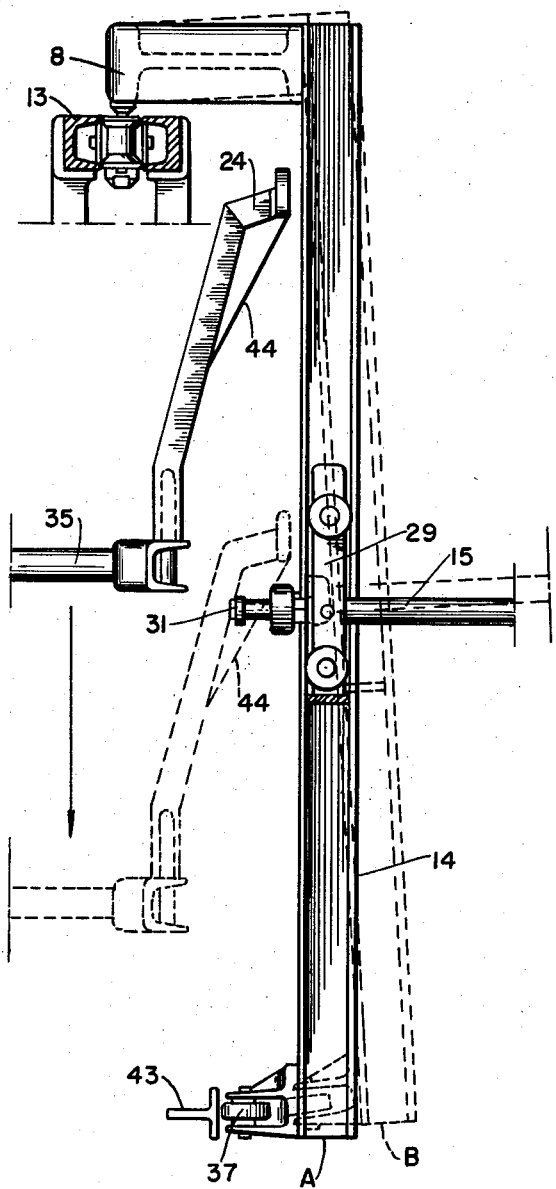
FIGURE 6 is a view similar to FIGURES 2 through 5 showing the vertically suspended track from the carriage being of a tiltable construction for cooperation with the intermediate bridge member.

In FIGURE 6 the sequence of events is shown should the fixed center portion 24 of the bridge accidentally strike the work carrier arm 15.

If as a result of a faulty impulse, a carriage, in the solid line position A, when vertical guide rail 14 and work carrier arm 15 has been carried forward to the fixed part of the bridge member 24, when this is on its way from the upper position shown in solid lines to its lower position shown in dotted lines. The portion 24 of the bridge, because of its sliding surface 44, urges the carriage into position B shown in dotted lines and can pass by it freely because the carriage runs freely against the track 43 at the bottom through the roller 37 and so can be moved outwardly, as shown in FIGURE 6.

In FIGURE 7 the three-part bridge member 23, 24, 25 is in the upper position. The horizontal carriage 8 has been advanced in the direction of the arrow towards the rail 32, which rail is suspended over treatment tank 47. The roller 15a of the work carrier arm 15 is over the middle of tank 47. The side view shows that the lever 46 of the extension shaft 30 with the roller 31 of the work carrier arm 15 is in position b. The roller 31 is thus on the rail 32. Thus if the bridge member 23, 24, 25 descends, the work carrier arm 15 remains on the rail 32 and the goods on the work carrier arm 15 are not immersed in the tank 47.

On the next advance in the direction of the arrow to the flipper 25, the roller 31 again leaves the rail 32 and the work carrier arm 15 again participates in the movement of the platform or bridge assembly carried by the elevator 35. It is, therefore, immersed in the tank 48. The slot 45 with the detent incisions a, b, is shown with the lever 46 actually in position b.

FIGURES 9 and 10 show how an accident is avoided should the roller 31 strike the rail 32 from below. The lower portion of FIGURE 9 shows Roman numeral I in which the bridge member is travelling upwards and takes the work carrier arm 15 with it, the roller 31 being in its extended position in relation to the rail 32.

As shown in Roman numeral II, the upper portion of FIGURE 9, the roller 31 strikes the rail 32 from below and if the rail were not movable upwards, as shown in dotted lines, the lifting arm would be bent.

Roman numeral III, the upper portion of FIGURE 10, shows the roller 31 as having passed the rail 32 and lies in its correct position on the rail; this view is similar to the position occupied in the intermediate station of FIGURE 7.

Roman numeral IV, the lower portion of FIGURE 10, shows the bridge member 24 as having returned to the lower position and the work carrier has remained on the rail 32.

Although I have disclosed herein the best form of the invention known to me at this time, I reserve the right to all such modifications and changes as may come within the scope of the following claims.

What I claim is:

1. An apparatus for conveying goods to be treated in a plurality of treatment baths having a static frame comprising (a) a horizontally moving conveyor mounted on a static frame, (b) at least one horizontally running carriage freely movable along said conveyor, (c) at least one vertically suspended track connected to said horizontal carriage for raising and lowering goods, (d) at least one vertically running carriage running in said vertically suspended track, (e) lift arms extending from said vertically running carriage in said vertically suspended track, said lift arms extending over the treatment baths, (f) elevating means carried by said static frame and being positioned to effect raising and lowering of the vertically travelling carriages and lift arms, (g) bridge means carried by said elevating means having three portions, one center portion of which partakes of vertical movement only with said elevating means and the other two of which partake of both vertical and lateral movement with said elevating means, one of said lateral portions being adapted to effect lifting of the lifting arm and being capable of sliding past a lifting arm as the elevating means lowers and falling to a working position at its lowest point and during lifting, engaging the lifting arm, the other lateral portion being capable of being guided under the lifting arm to be lowered when in the highest position, and being adapted to take the lifting arm down with it whilst dropping into a position of rest when in the lowest position and being capable of being raised again without engaging the lifting arm, and (h) means selectively extending said work carrier arms toward and away from said static frame for retaining and releasing selective ones of said work carrier arms to omit preselected work carrier arms from less than all treatment baths.

2. Apparatus as claimed in claim 1 in which the side of the bridge means adjacent the end of the lifting arm has a sliding surface.

3. Apparatus as claimed in claim 2, in which the sliding surface of the other lateral portion is so constructed that the roller is guided onto the lifting edge of the bridge means into engagement with said work carrier arm.

4. Apparatus as claimed in claim 2 in which the sliding surface of the center portion of the bridge means is adapted during the lowering of the platform, to urge the end of the lifting arm outwards away from the conveyor path so that the fixed portion of said bridge comes into the correct lifting position beneath the work carrier arm.

5. Apparatus as claimed in claim 1 in which the other lateral portion of the bridge member is adapted to avoid engaging the work carrier arm until it reaches a position near its upper limit of movement.

6. Apparatus as claimed in claim 5 in which one of said lateral portions of the bridge means is brought into engagement with the lifting roller of the work carrier arm as it approaches its upper limit of movement by the provision of roller means operating against a cam to urge the front lateral portion into alignment with the other portions of the bridge means.

7. Apparatus as claimed in claim 1 in which the vertically suspended track may be horizontally pivoted upwards whereby damage is avoided on accidental contact of the extension of the work carrier arm therewith.

8. Apparatus as claimed in claim 1 in which the lifting path of each vertically moving carriage is provided with a sliding contact which can be set to various operating positions by rotation of the rotary arm so that each carriage can be supplied individually and selectively by a number of bus bars for the supply of current.

References Cited in the file of this patent
UNITED STATES PATENTS

| | | |
|---|---|---|
| 2,605,882 | Curtis | Aug. 5, 1952 |
| 2,736,441 | Hauck | Feb. 28, 1956 |
| 2,826,288 | Giaier | Mar. 11, 1958 |
| 2,902,181 | Hauck | Sept. 1, 1959 |